C. E. PEARSON.
DYNAMO.
APPLICATION FILED DEC. 29, 1916.
1,291,107.
Patented Jan. 14, 1919.
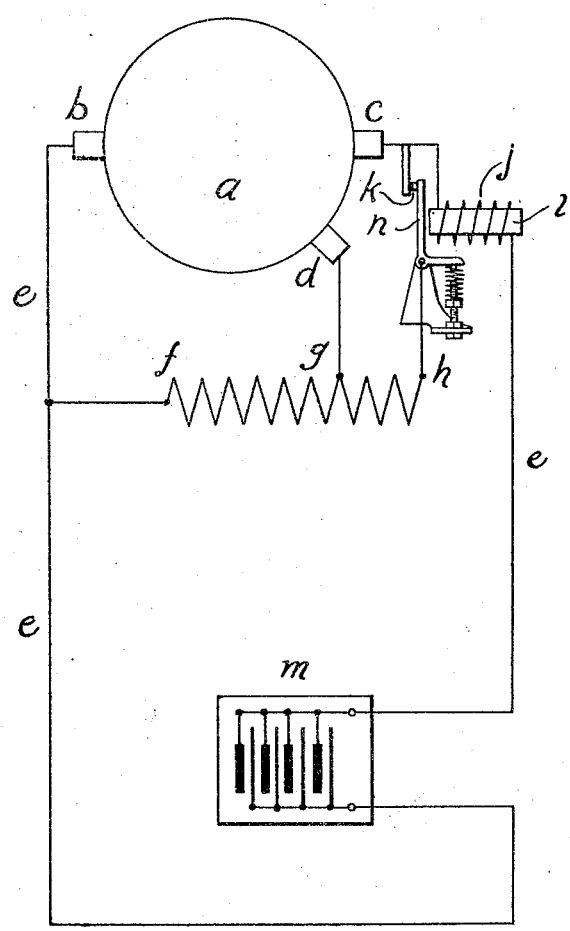

UNITED STATES PATENT OFFICE.

CARL E. PEARSON, OF LANSING, MICHIGAN.

DYNAMO.

1,291,107.     Specification of Letters Patent.     Patented Jan. 14, 1919.

Application filed December 29, 1916. Serial No. 139,464.

*To all whom it may concern:*

Be it known that I, CARL E. PEARSON, a citizen of the United States, residing at Lansing, county of Ingham, State of Michigan, have invented a certain new and useful Improvement in Dynamos, and declare the following to be a full, clear, and exact description of the same, such as will enable others skilled in the art to which it pertains to make and use the same, reference being had to the accompanying drawings, which form a part of this specification.

My invention relates to dynamos and an object of my improvements is to provide for securing an improved regulation in electrical apparatus for charging the battery used for operating said apparatus.

I secure this object in the device illustrated in the accompanying drawing in which, The figure represents diagrammatically the combination of parts constituting my invention.

$a$ is the dynamo, $b$ and $c$ are the main brushes and $d$ is a third or intermediate brush. $e$ is the main or working circuit and $f\,g\,h$ is a field winding normally connected across the working circuit $e$ at its ends $f$ and $h$ and, at an intermediate point $g$, connected with the third brush $d$.

$m$ is a storage battery in the circuit $e$. $i$ is a magnet core having a coil $j$ wound around it which coil is interposed in the circuit $e$. $n$ is a pivoted armature or lever arm in electrical connection with one end of the field coil $f\,g$ and making contact at $k$ to connect the field coil across the main circuit. The armature $n$ is adapted to be acted upon by the magnet $j$ to break the circuit at $k$.

The operation of the above described apparatus is as follows:

When the armature of the dynamo has attained a certain speed it begins to generate a current against the voltage of the battery and to charge the latter. As the speed of rotation of the armature of the dynamo increases the portion $g\,h$ of the field winding assists the main portion $f\,g$ of said winding to raise the rate of increase of voltage. At a certain predetermined current in the main circuit the magnet $i\,j$ attracts the armature $s$ which after moving a distance strikes against the arm $n$ breaking the contact at $k$. This throws the field coil $g\,h$ out of circuit and at the same time confines the current in the main field winding to that flowing between a main brush $b$ and the third or intermediate brush $d$. The third brush $d$ will now regulate the action of the dynamo.

When the current falls off again in the main circuit the spring will retract the armature $s$ and the contact will be remade at $k$ to establish the circuit as first above described.

It is to be noted that there is a free moving armature which does not separate the contact points until it has traveled a distance, when it is pulled to the magnet core it will remain there during a variation of approximately five per cent. of the output.

The solenoids $i$ and co-acting apparatus constitutes a make-and-break apparatus of the non-vibratory type.

What I claim is:

1. In an apparatus of the kind described, a dynamo having two main brushes and an intermediate brush, a field coil wound in one sense between said main brushes and connected between its ends to the third brush, and means for breaking the circuit between said coil and one of said main brushes.

2. In an apparatus of the kind described, a dynamo having two main brushes and an intermediate brush, a field coil connected between said main brushes and connected between its ends to the third brush, and an automatic means, operated by an electric current in the system, for breaking the circuit between said coil and one of said main brushes.

3. In an apparatus of the kind described, a dynamo having three brushes, an energizing coil wound in one sense connected to said three brushes, and means for breaking the circuit between said coil and one of said brushes.

4. In an apparatus of the kind described, a dynamo having two main brushes and an intermediate brush, an energizing coil wound in one sense between said brushes and means for disconnecting one of said main brushes from said coil, for the purpose described.

In testimony whereof, I sign this specification.

CARL E. PEARSON.